United States Patent
Markusic

(10) Patent No.: US 10,632,952 B2
(45) Date of Patent: Apr. 28, 2020

(54) SEMI-RIGID DEPLOYABLE SHOULDER AND PELVIS RESTRAINT SYSTEM

(71) Applicant: HONDA MOTOR CO., LTD., Minato-ku, Tokyo (JP)

(72) Inventor: Craig Markusic, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 16/004,017

(22) Filed: Jun. 8, 2018

(65) Prior Publication Data

US 2019/0375361 A1    Dec. 12, 2019

(51) Int. Cl.
| | |
|---|---|
| *B60R 21/207* | (2006.01) |
| *B60R 21/055* | (2006.01) |
| *B60R 21/02* | (2006.01) |
| *B60R 21/00* | (2006.01) |

(52) U.S. Cl.
CPC .......... *B60R 21/207* (2013.01); *B60R 21/055* (2013.01); *B60R 2021/0006* (2013.01); *B60R 2021/0044* (2013.01); *B60R 2021/0055* (2013.01); *B60R 2021/0058* (2013.01); *B60R 2021/022* (2013.01)

(58) Field of Classification Search
CPC .. B60R 21/207; B60R 21/18; B60R 2021/022
See application file for complete search history.

(56) References Cited

U.S. PATENT DOCUMENTS

| | | | |
|---|---|---|---|
| 3,623,768 A | 11/1971 | Capener et al. | |
| 6,158,812 A * | 12/2000 | Bonke | B60R 16/08 297/391 |
| 8,820,830 B2 | 9/2014 | Lich et al. | |
| 9,238,425 B2 | 1/2016 | Fukawatase | |
| 9,827,876 B2 * | 11/2017 | Madaras | B60N 2/0276 |
| 10,232,815 B1 * | 3/2019 | Dry | B60R 21/18 |
| 2005/0236819 A1 | 10/2005 | Riedel et al. | |
| 2006/0289220 A1 | 12/2006 | Oota et al. | |
| 2008/0079249 A1 | 4/2008 | Yamamura | |
| 2009/0200775 A1 | 8/2009 | Sugimoto et al. | |
| 2009/0302584 A1 | 12/2009 | Sugimoto et al. | |
| 2011/0057487 A1 | 3/2011 | Suzuki | |
| 2012/0007408 A1 | 1/2012 | Freienstein et al. | |
| 2016/0082915 A1 | 3/2016 | Madaras | |

FOREIGN PATENT DOCUMENTS

| | | | | |
|---|---|---|---|---|
| DE | 19622662 C1 * | 8/1997 | .......... | B60R 21/207 |
| JP | 2014-121924 A | 7/2014 | | |
| KR | 10-1746824 B1 | 6/2017 | | |

* cited by examiner

*Primary Examiner* — Nicole T Verley
(74) *Attorney, Agent, or Firm* — Arent Fox LLP

(57) ABSTRACT

The present disclosure is directed to passenger restraint system, deployable upon detection of an imminent side impact vehicle collision. The restraint system contains both an inner inflatable portion and an outer rigid telescopic portion, resulting in a semi-rigid restraint system. The restraint system may be mounted to the outboard and/or inboard sides of a vehicle seat, to protect the passenger from forces from an intruding door structure (or vehicle structure) or from other passengers. Mounting the restraint system to the vehicle seat may limit the force load that is transferred from the vehicle to the occupant, compared to a restraint system mounted to the vehicle interior.

20 Claims, 4 Drawing Sheets

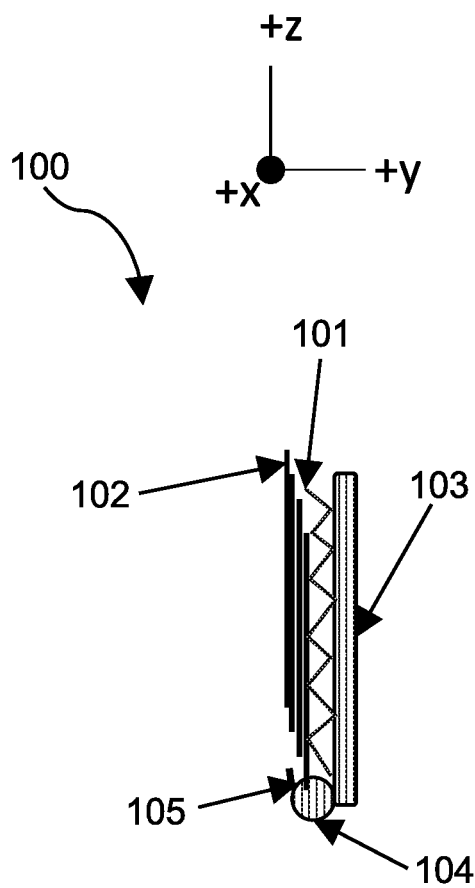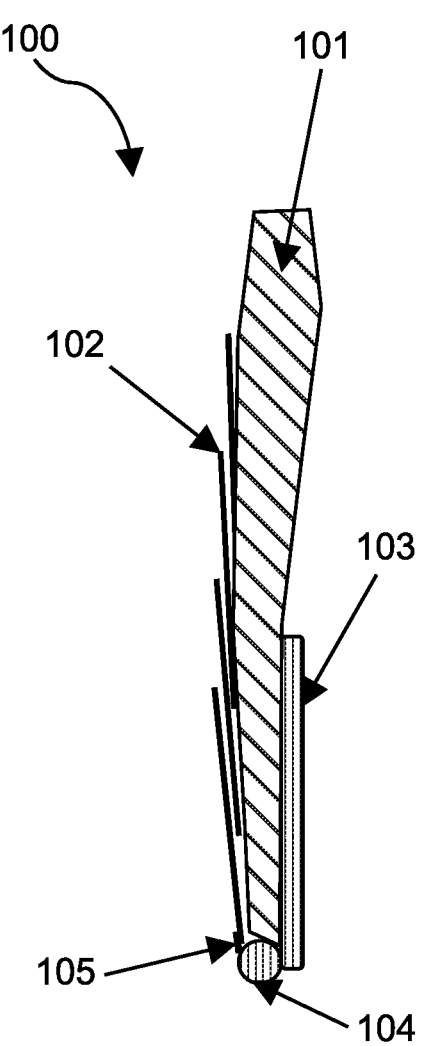
Fig. 1A
Fig. 1B
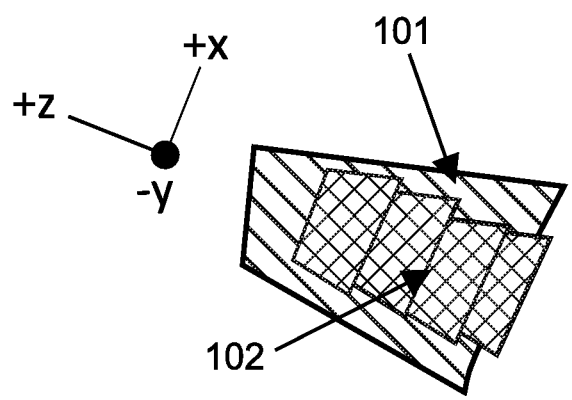
Fig. 1C

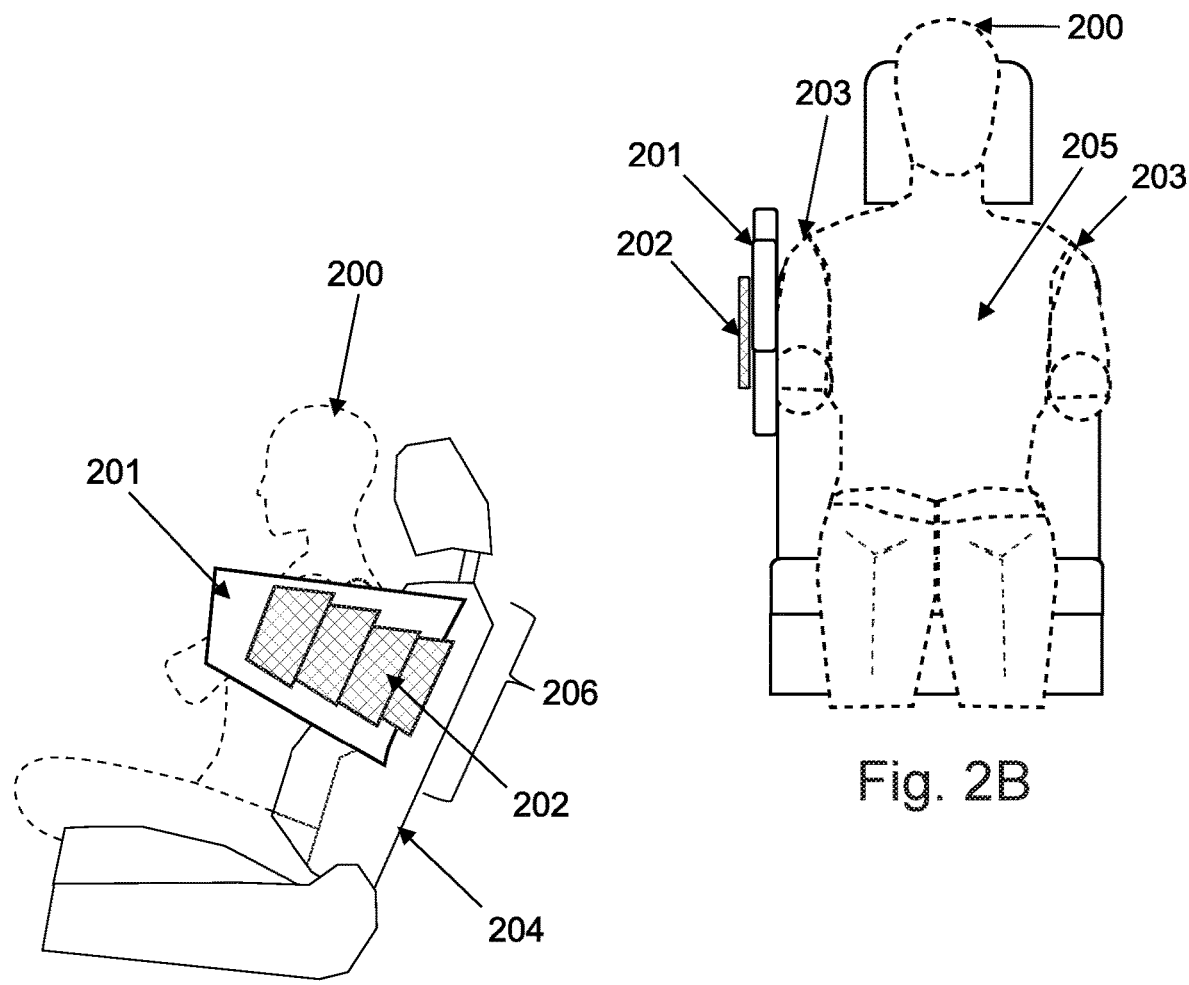
Fig. 2A
Fig. 2B
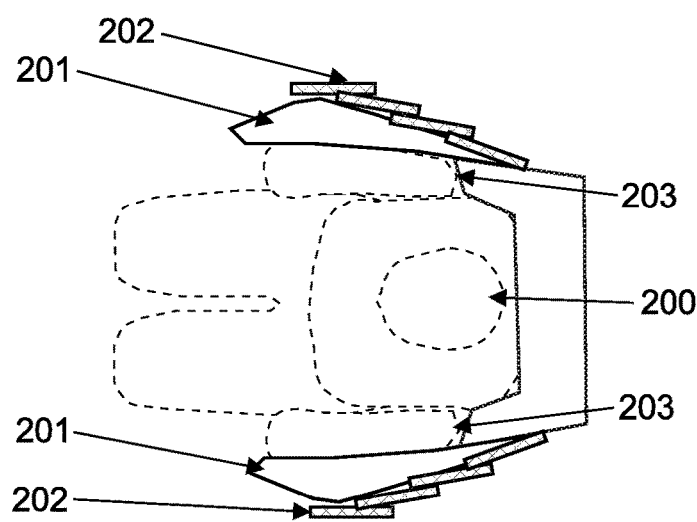
Fig. 2C

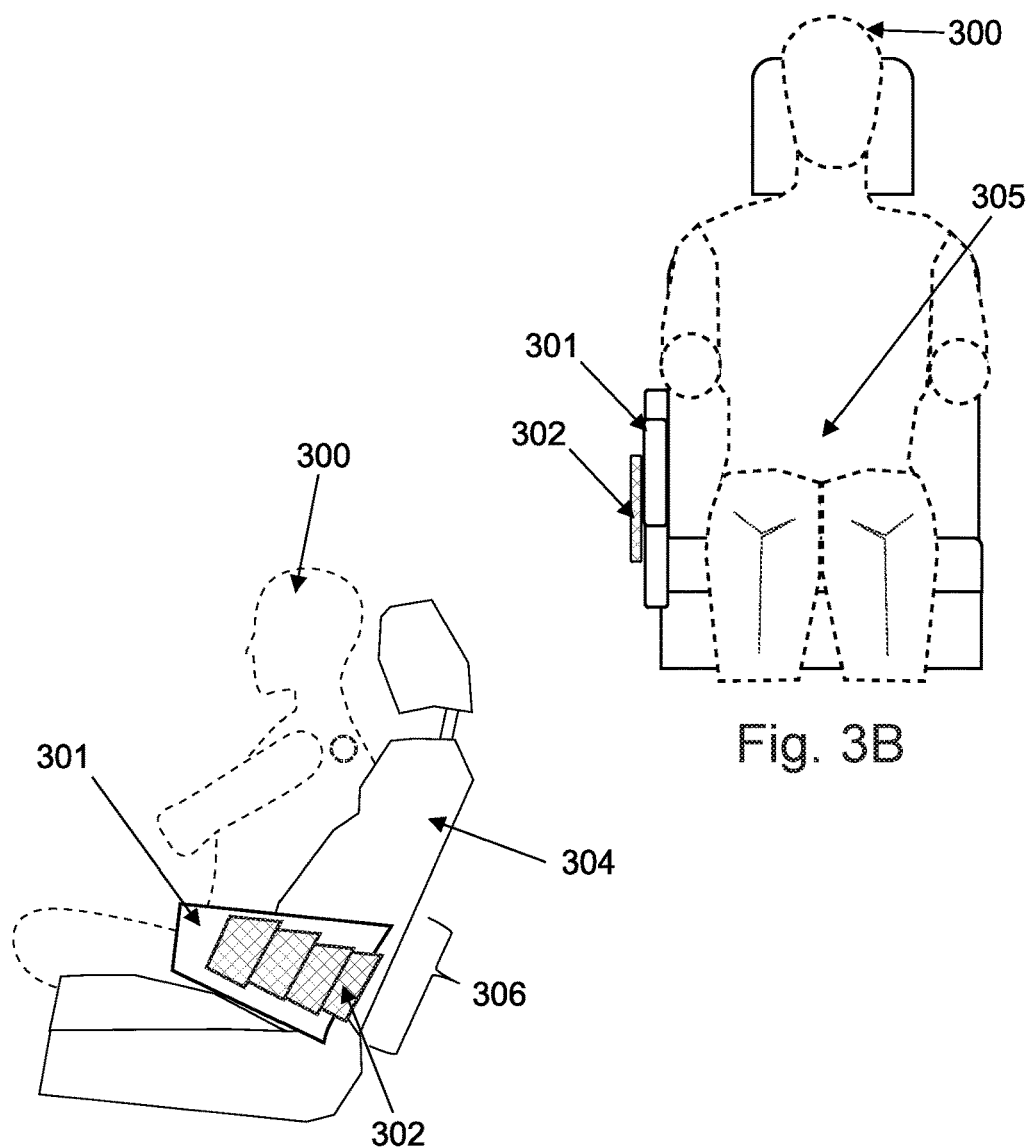
Fig. 3B
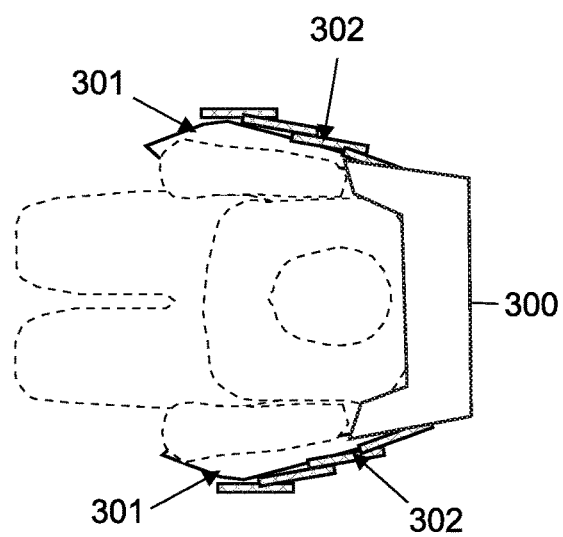
Fig. 3A
Fig. 3C

SEMI-RIGID DEPLOYABLE SHOULDER AND PELVIS RESTRAINT SYSTEM

INTRODUCTION

The present disclosure generally relates to restraint systems in vehicles, specifically passenger vehicles.

BACKGROUND

There are currently many inflatable passenger restraint systems on the market but none specifically designed to restrict lateral inboard and outboard motion relative to vehicle, and none with rigid elements.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In some aspects, the present disclosure is directed to a semi-rigid restraint system, comprising: an inner inflatable portion, coupled to an outer telescoping rigid portion, wherein the restraint system is secured to a vehicle seat comprising a lower seat back, an upper seat back, a seat bottom, and outboard and inboard sides.

In some aspects, the present disclosure is directed to a semi-rigid restraint system, comprising: an inner inflatable portion, coupled to an outer telescoping rigid portion, wherein the restraint system is secured to a vehicle seat comprising a lower seat back, an upper seat back, a seat bottom, and outboard and inboard sides, and wherein the restraint system is secured to the vehicle seat on at least the outboard side.

In some aspects, the present disclosure is directed to a semi-rigid restraint system, comprising: an inner inflatable portion, coupled to an outer telescoping rigid portion, wherein the restraint system is secured to a vehicle seat comprising a lower seat back, an upper seat back, a seat bottom, and outboard and inboard sides, and wherein the restraint system is secured to the vehicle seat on both the outboard and inboard sides.

These and other aspects of the invention will become more fully understood upon a review of the detailed description, which follows.

BRIEF DESCRIPTION OF THE DRAWINGS

FIG. 1A shows an example semi-rigid restraint system according to some aspects of the present disclosure in a stowed configuration.

FIG. 1B shows an example semi-rigid restraint system according to some aspects of the present disclosure in a deployed configuration.

FIG. 1C shows a side view of portions of the semi-rigid restraint system shown in FIG. 1B.

FIGS. 2A-2C show different views of the semi-rigid restraint system shown in FIG. 1B secured to a vehicle seat at the upper seat back according to some aspects of the present disclosure in a deployed configuration.

FIGS. 3A-3C show different views of the semi-rigid restraint system shown in FIG. 1B secured to a vehicle seat at the lower seat back according to some aspects of the present disclosure in a deployed configuration.

DETAILED DESCRIPTION

Figure 4A:
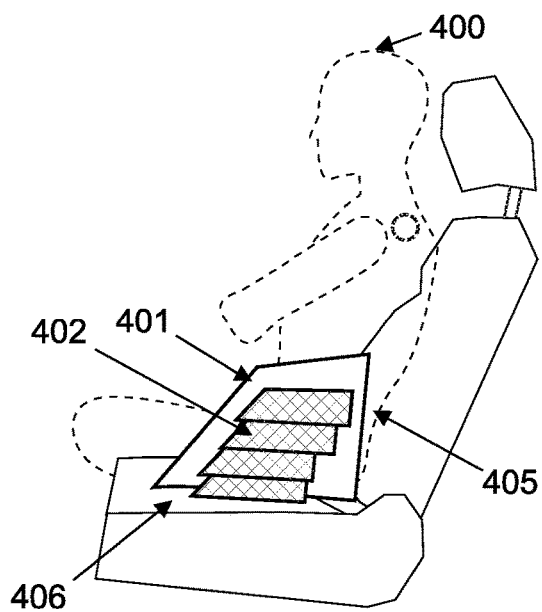
FIGS. 4A-4B show side views of the semi-rigid restraint system shown in FIG. 1B secured to a vehicle seat at the seat bottom according to some aspects of the present disclosure in a deployed configuration.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure is directed to a passenger restraint system, specifically, a shoulder and pelvis restraint system. Most side impact restraints are designed to be deployed between the occupant and the door. This increases the occupant's exposure to forces from an intruding door structure. The restraints of the present disclosure are designed to restrain the occupant's torso without being deployed against the door. The semi-rigid elements may provide enough support to prevent or at least delay engagement with the door until later in the event when the door to occupant relative velocity is lower, and the impact may be minimized.

The restraint system of the present disclosure has a semi-rigid construction including an inner inflatable portion coupled to an outer telescoping rigid portion. The restraint system includes a rotating restraint mount securing the restraint to the seat.

Multiple aspects of the disclosure are described herein. In some aspects, the restraint is mounted to a seatback at an upper location (i.e., for protecting a chest/shoulder area). In other aspects, the restraint is mounted to a lower portion of the seatback (i.e., for protecting a pelvic region). In still other aspects, the restraint is mounted to a seat bottom for protecting the pelvic region, the thighs, and the lower back region of a passenger in the seat. In still other aspects, the restraint is mounted to two or more of an upper seat back, a lower seat back, and a seat bottom. The restraint can be included on one or both sides of the seat, i.e., the outboard and inboard sides of the seat. In an alternate aspect, the restraint may be mounted to the vehicle interior, such as the rear trim, and configured to be deployed in a forward direction (i.e., in the direction of forward motion of the vehicle). Mounting the restraint to the seat instead of the interior of the vehicle itself (such as the side interior and/or the rear trim) may reduce the transfer of force from the side impact collision to the passenger; further, by deploying a restraint system that is secured to a seat, impact between the passenger's body and an intruding part of the car may be avoided. If the restraint system were deployed from the intruding surface, then the passenger may be impacted by forces of both the intruding surface and the deploying restraint system. For a side impact collision, mounting the restraint system to the seat may avoid a large portion of the forces from the collision, particularly if the seat is coupled to the vehicle vertically rather than laterally.

The semi-rigid restraint systems described herein may be used in any type of vehicle, without any particular limitation.

As will be known to those of ordinary skill in the art, the "outboard" side of the seat is the lateral side of the seat facing the vehicle wall or door, and the "inboard" side of the seat is the lateral side of the seat facing the further interior of the vehicle. As will be known to those of ordinary skill in the art, the further interior of the vehicle may contain other passengers and vehicle components.

FIG. 1A shows semi-rigid restraint system 100 in a stowed configuration according to some aspects of the present disclosure. Inner inflatable portion 101 is shown in an accordion-folded configuration between outer rigid telescopic portion 102 and seat side frame 103. Inner inflatable portion 101 is suitably composed of a nylon fabric such as those known in the vehicle airbag art. Outer rigid telescopic portion 102 is suitably composed of a carbon fiber material, a plastic material, or an aluminum material, such as a carbon fiber material or a plastic material. Inner inflatable portion 101 is coupled to outer rigid telescopic portion 102 by any suitable mechanical means known in the art, including, but not limited to, riveting, nuts and bolts, plastic fasteners, stitching, or a combination thereof. As will be known to those of ordinary skill in the art, the suitability of stitching may depend on the plastic material or carbon fiber material used in the outer rigid telescopic portion 102. Seat side frame 103 may suitably be composed of any materials known in the vehicle seat frame art. Outer rigid telescopic portion 102 is secured to seat side frame 103 via a rotating mount 104, which has a rotation stop 105 limiting the rotation. Outer rigid telescopic portion 102 may be secured to rotating mount 104 by any suitable means, including but not limited to, rivets or nuts and bolts. Rotating mount 104 is suitably composed of a carbon fiber material, a plastic material, or an aluminum material.

FIG. 1B shows the semi-rigid restraint system 100 in a deployed configuration according to some aspects of the present disclosure. Restraint system 100 is configured to deploy in response to detection of an imminent side impact collision, detection may be by any suitable means known in the art, including, but not limited to, an accelerometer based crash detection sensor system, a door mounted pressure transducer based crash detection sensor system, or a radar based system designed to detect vehicles or objects approaching the side of the subject vehicle. In deployment, inflatable portion 101 and outer rigid telescopic portion 102 inflate and extend, respectively; inner inflatable portion 101 may be configured to inflate by any suitable means known in the art, and outer rigid telescopic portion 102 is suitably configured to extend upon or along with inflation of inner inflatable portion 101. The degree to which these inflate and extend depends on several factors, such as the position of the restraint system 100 relative to the passenger and what portion of the passenger's body the restraint system 100 is placed to protect. In some aspects, the inflatable portion 101 and the outer rigid telescopic portion 102 extend to about the same length in the z-direction and about the same width in the x-direction. In some aspects, the inner inflatable portion 101 and the outer rigid telescopic portion 102 collectively inflate and expand to about 50 to about 100 mm in width or thickness (i.e., loft) upon deployment.

Also in the course of deployment, rotating mount 104 is rotated in the outboard direction up to a maximum defined by rotation stop 105. The degree of rotation can be tuned for the desired level of interaction with the body and may also depend on factors such as the size of the inflatable portion 101 and/or the outer rigid telescopic portion 102. In some aspects, rotating mount 104 is configured to rotate in the outboard direction by about 50 to about 20°, such as about 10° to about 15°. Rotating mount 104 may absorb some energy from a side impact collision and prevent its transfer to a passenger. In addition, the outboard rotation may allow inner inflatable portion 101 to deploy and inflate without exerting force on the passenger (not shown) in the seat (not shown).

Restraint system 100 may be located on one or both of the outboard and inboard sides of the vehicle seat. In some aspects, restraint system 100 is located on at least the outboard side. In some aspects, restraint system 100 is located on both the inboard and outboard sides of the vehicle seat. The dimensions and thicknesses of inner inflatable portion 101 and outer rigid telescopic portion 102 are suitably any dimensions and thicknesses known in the art.

FIG. 1C shows a side view of the inner inflatable portion 101 and the outer rigid telescopic portion 102 according to some aspects of the present disclosure. In some aspects, the maximum width of outer rigid telescopic portion 102 in the x-direction may be about the same as the maximum width of inner inflatable portion 101 in the x-direction. In some aspects, the maximum height of outer rigid telescopic portion 102 in the z-direction may be about the same as the maximum height of inner inflatable portion 101 in the z-direction. In some aspects, the maximum width of outer rigid telescopic portion 102 in the x-direction may be larger than the maximum width of inner inflatable portion 101 in the x-direction. In some aspects, the maximum width of outer rigid telescopic portion 102 in the z-direction may be larger than the maximum width of inner inflatable portion 101 in the z-direction. In some aspects, the maximum width of outer rigid telescopic portion 102 in the x-direction may be smaller than the maximum width of inner inflatable portion 101 in the x-direction. In some aspects, the maximum width of outer rigid telescopic portion 102 in the z-direction may be smaller than the maximum width of inner inflatable portion 101 in the z-direction. The relative width and height of the inner inflatable portion 101 to the outer rigid telescopic portion 102 will depend on several factors, including but not limited to the point of attachment of the restraint system to the vehicle seat and the regions of the body to be protected.

FIGS. 2A-2C show several views of a restraint system according to some aspects of the present disclosure, attached to upper seatback 206 (i.e., upper portion 206 of seat back 204), so as to protect the shoulders 203 and/or chest 205 of a passenger 200 from lateral and oblique loading in a side impact collision (i.e., the side of passenger 200, not his facing direction or backward direction). Inner inflatable portion 201 faces passenger 200, with outer rigid telescopic portions 202 outside of inflatable portion 201 (i.e., between inner inflatable portion 201 and an intruding vehicle wall, or between inner inflatable portion 201 and the further interior of the vehicle. Inner inflatable portion 201 may be similar in some aspects to inner inflatable portion 101. Outer rigid telescopic portion 202 may be similar in some aspects to outer rigid telescopic portion 102. As shown in FIGS. 2A-2C, the inner inflatable portion 201 and outer rigid telescopic portion 202 may be present on the inboard, outboard, or both sides of the passenger 200 in the vehicle seat (not shown).

FIGS. 3A-3C show several views of a restraint system according to some aspects of the present disclosure, attached to lower seatback 306 (i.e., lower portion 306 of seat back 304), so as to protect the pelvic area 305 of a passenger 300 from lateral and oblique loading in a side impact collision (i.e., the side of passenger 300, not his facing direction or backward direction). Inner inflatable portion 301 faces passenger 300, with outer rigid telescopic portions 302 outside of inflatable portion 301 (i.e., between inner inflatable portion 301 and an intruding vehicle wall, or between inner inflatable portion 301 and the further interior of the vehicle. Inner inflatable portion 301 may be similar in some aspects to inner inflatable portion 101. Outer rigid telescopic portion 302 may be similar in some aspects to outer rigid telescopic portion 102. Seat back 304 may be similar in some aspects to seat back 204. As shown in FIGS. 3A-3C, the inner inflatable portion 301 and outer rigid telescopic portion 302 may be present on the inboard, outboard, or both sides of the passenger 300 in the vehicle seat (not shown).

Figure 4B:
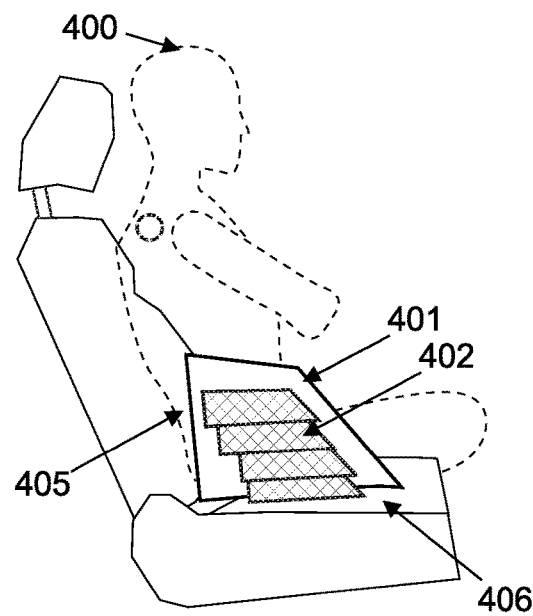
Figure 4C:
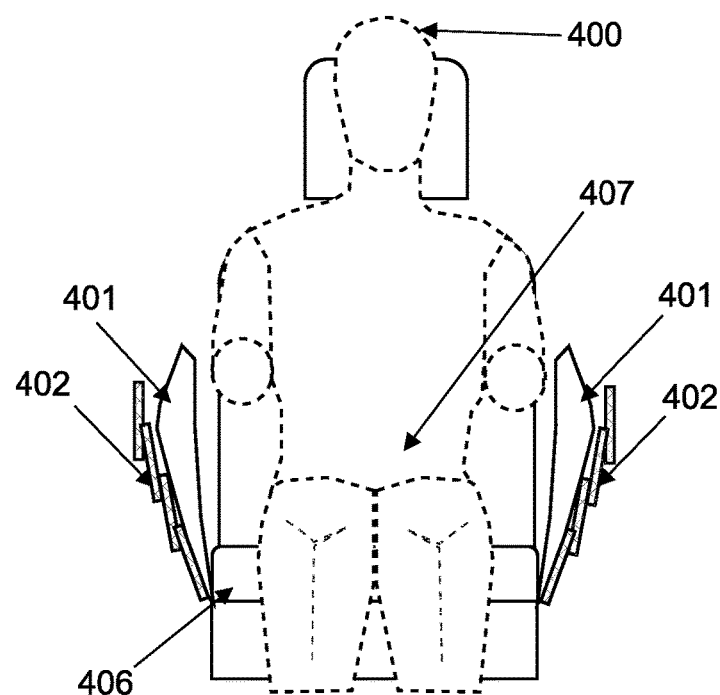
FIG. 4C shows a front view of the semi-rigid restraint system shown in FIG. 1B secured to a vehicle seat at the seat bottom according to some aspects of the present disclosure in a deployed configuration.

FIGS. 4A-4C show side views of a restraint system according to some aspects of the present disclosure, attached to seat bottom 406, so as to protect the pelvic area 407 and lower back region 405 of a passenger 400. The restraint system may be attached to the seat bottom at any position from the front to the back of the seat bottom, depending on the body region to be protected. For example, a restraint system attached at the middle of the seat bottom 406 is suitably disposed to protect the thigh region (not shown) of passenger 400, a restraint system attached towards the rear of the seat bottom 406 is suitably disposed to protect the pelvic area 407 and lower back region 405 of passenger 400, and a restraint system attached towards the front of the seat bottom may be suitably disposed to protect the knees of passenger 400. Inner inflatable portion 401 and outer rigid telescopic portion 402 are suitably attached to an external portion of seat bottom 402, such as to a seat frame (not shown). Inner inflatable portion 401 may be similar in some aspects to inner inflatable portion 101. Outer rigid telescopic portion 402 may be similar in some aspects to outer rigid telescopic portion 102. As shown in FIGS. 4A-B, the inner inflatable portion 401 and outer rigid telescopic portion 402 may be present on the left or right side of the passenger 400. As shown in FIGS. 4A-4C, the inner inflatable portion 401 and outer rigid telescopic portion 402 may be present on the inboard, outboard, or both sides of the passenger 400 in the vehicle seat (not shown).

This written description uses examples to disclose the invention, including the preferred aspects, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various aspects described, as well as other known equivalents for each such aspect, can be mixed and matched by one of ordinary skill in the art to construct additional aspects and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

The invention claimed is:

1. A semi-rigid restraint system, comprising:
an inner inflatable portion, coupled to
an outer telescoping rigid portion, wherein the restraint system is secured to a vehicle seat comprising a headrest, a lower seat back, an upper seat back, a seat bottom, and outboard and inboard sides, wherein the semi-rigid restraint system is rotatably mounted to the seat.

2. A semi-rigid restraint system, comprising:
an inner inflatable portion, coupled to
an outer telescoping rigid portion, wherein the restraint system is secured to a vehicle seat comprising a headrest, a lower seat back, an upper seat back, a seat bottom, and outboard and inboard sides, wherein the outer telescoping rigid portion is configured to telescope from a stowed configuration to a deployed configuration from at least one of the lower seat back, the upper seat back, or the seat bottom, and the inner inflatable portion is configured to inflate at least in a direction away from the deployed outer telescoping rigid portion and toward a side of the vehicle seat.

3. The semi-rigid restraint system of claim 2, wherein the inner inflatable portion comprises a nylon fabric material.

4. The semi-rigid restraint system of claim 2, wherein the outer telescoping rigid portion comprises a carbon fiber, plastic, or aluminum material.

5. The semi-rigid restraint system of claim 4, wherein the telescoping rigid portion comprises a carbon fiber or plastic material.

6. The semi-rigid restraint system of claim 2, wherein the inner inflatable portion is coupled to the outer telescoping rigid portion by one or more rivets, one or more nuts and bolts, or one or more stitches, or a combination thereof.

7. The semi-rigid restraint system of claim 6, wherein the inner inflatable portion is coupled to the outer telescoping rigid portion by one or more rivets or one or more nuts and bolts, or a combination thereof.

8. The semi-rigid restraint system of claim 2, wherein the restraint system is secured to the vehicle seat at the upper seat back, the lower seat back, or the seat bottom, or a combination thereof.

9. The semi-rigid restraint system of claim 8, wherein the restraint system is secured to the vehicle seat at the upper seat back.

10. The semi-rigid restraint system of claim 8, wherein the restraint system is secured to the vehicle seat at the lower seat back.

11. The semi-rigid restraint system of claim 8, wherein the restraint system is secured to the vehicle seat at the seat bottom.

12. The semi-rigid restraint system of claim 2, wherein the restraint system is secured to the vehicle seat on both the outboard and inboard sides.

13. A semi-rigid restraint system, comprising:
an inner inflatable portion, coupled to
an outer telescoping rigid portion, wherein the restraint system is secured to a vehicle seat comprising a lower seat back, an upper seat back, a seat bottom, and outboard and inboard sides, and
wherein the restraint system is secured to the vehicle seat on at least the outboard side, and wherein the outer telescoping rigid portion is configured to telescope from a stowed position to a deployed position, and the inner inflatable portion is configured to inflate at least in a space between the deployed telescoping rigid portion and a side of an occupant of the vehicle seat.

14. The semi-rigid restraint system of claim 13, wherein the restraint system is secured to the vehicle seat at the lower seat back, the upper seat back, or the seat bottom, or a combination thereof.

15. The semi-rigid restraint system of claim 14, wherein the restraint system is secured to the vehicle seat at the upper seat back.

16. The semi-rigid restraint system of claim 14, wherein the restraint system is secured to the vehicle seat at the lower seat back.

17. The semi-rigid restraint system of claim 14, wherein the restraint system is secured to the vehicle seat at the seat bottom.

18. The semi-rigid restraint system of claim 13, wherein the restraint system is secured to the vehicle seat on both the outboard and inboard sides.

19. The semi-rigid restraint system of claim 13, wherein the restraint system is secured to the vehicle seat on both the outboard and inboard sides.

20. The semi-rigid restraint system of claim 19, wherein system is secured to the vehicle seat at the lower seat back, the upper seat back, or the seat bottom, or a combination thereof.

* * * * *